United States Patent
Dmytrenko et al.

(10) Patent No.: US 10,817,652 B2
(45) Date of Patent: Oct. 27, 2020

(54) DEEP LINKING TO COMPONENTS USING CONFIGURATION MAPS

(71) Applicant: salesforce.com, inc., San Francisco, CA (US)

(72) Inventors: Artem Dmytrenko, San Francisco, CA (US); Wenqing Dai, San Francisco, CA (US); Adheip Varadarajan, San Francisco, CA (US); Amruta Madhukar Chitnis, Redwood Shores, CA (US); Ruifeng Xu, San Mateo, CA (US)

(73) Assignee: salesforce.com, inc., San Francisco, CA (US)

( * ) Notice: Subject to any disclaimer, the term of this patent is extended or adjusted under 35 U.S.C. 154(b) by 61 days.

(21) Appl. No.: 16/264,370

(22) Filed: Jan. 31, 2019

(65) Prior Publication Data
US 2020/0250258 A1 Aug. 6, 2020

(51) Int. Cl.
*G06F 40/00* (2020.01)
*G06F 40/134* (2020.01)
*G06F 40/14* (2020.01)
*G06F 40/137* (2020.01)

(52) U.S. Cl.
CPC .......... *G06F 40/134* (2020.01); *G06F 40/137* (2020.01); *G06F 40/14* (2020.01)

(58) Field of Classification Search
CPC .................................................... G06F 40/134
See application file for complete search history.

(56) References Cited

U.S. PATENT DOCUMENTS

| | | | |
|---|---|---|---|
| 7,730,478 B2 | 6/2010 | Weissman | |
| 7,779,039 B2 | 8/2010 | Weissman et al. | |
| 9,633,378 B1 * | 4/2017 | Nath | G06Q 30/0277 |
| 10,402,174 B2 | 9/2019 | Varadarajan et al. | |
| 2005/0222933 A1 * | 10/2005 | Wesby | H04L 67/10 705/36 R |
| 2016/0189225 A1 * | 6/2016 | Glover | G06F 16/9537 705/14.55 |
| 2017/0257424 A1 * | 9/2017 | Neogi | G06F 9/5044 |

(Continued)

OTHER PUBLICATIONS

Azim et al., "uLink: Enabling User-Defined Deep Linking to App Content," MobiSys 2016, copyright 2016 ACM, p. 305-318 (Year: 2016).*

(Continued)

*Primary Examiner* — Amelia L Tapp
(74) *Attorney, Agent, or Firm* — Haynes and Boone, LLP

(57) ABSTRACT

A method is provided for generating a composite configuration map that is used for deep linkable to a component. In some embodiments, the method includes obtaining a page including a plurality of components organized in accordance with a hierarchy. The method also includes for one or more components of the plurality of components: generating, based on the hierarchy, a set of container configurations for the respective component, each container configuration being a configuration of a container that includes the respective component; and generating a container configuration map for the respective component based on the set of container configurations. The method further includes generating a composite configuration map including each of the container configuration maps.

20 Claims, 8 Drawing Sheets

(56) References Cited

U.S. PATENT DOCUMENTS

| | | |
|---|---|---|
| 2019/0065155 A1 | 2/2019 | Varadarajan et al. |
| 2019/0065157 A1 | 2/2019 | Varadarajan et al. |
| 2019/0065158 A1 | 2/2019 | Varadarajan et al. |
| 2019/0065159 A1 | 2/2019 | Varadarajan et al. |
| 2019/0205403 A1 | 7/2019 | Hussain et al. |

OTHER PUBLICATIONS

Vliegendhart et al., "How Do We Deep-Link? Leveraging User-Contributed Time-Links for Non-Linear Video Access," MM '13, copyright 2013 ACM, p. 517-520. (Year: 2013).*

"Configuration management with Containers," Apr. 4, 2016, retrieved from https://kubernetes.io/blog/2016/04/configuration-management-with-containers, p. 1-7. (Year: 2016).*

* cited by examiner

DEEP LINKING TO COMPONENTS USING CONFIGURATION MAPS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to a computing device, and more specifically to systems and methods for deep linking to components using configuration maps.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Computer and software development is evolving away from the client-server model toward network-based processing systems that provide access to data and services via the Internet or other networks. In contrast to traditional systems that host networked applications on dedicated server hardware, a "cloud" computing model allows applications to be provided over the network "as a service" supplied by an infrastructure provider. The infrastructure provider typically abstracts the underlying hardware and other resources used to deliver a user-developed application so that a user (e.g., consumer of cloud-based services) no longer needs to operate and support dedicated server hardware. The cloud computing model can often provide substantial cost savings to the user over the life of the application because the user no longer needs to provide dedicated network infrastructure, electrical and temperature controls, physical security and other logistics in support of dedicated server hardware.

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.). In one example, the cloud platform may support customer relationship management (CRM) solutions. This may include support for sales, service, marketing, community, analytics, applications, and the Internet of Things (IoT).

A user may request information from servers operating in the cloud. In an example, the user may request a webpage including multiple nested objects (e.g., tabs within tabs). After traversing through multiple nested objects on the webpage, the user may find an object of interest. Typically, the user is unable to directly access that object of interest. Rather, to access the object of interest again, the user requests the webpage and again traverses through the multiple nested objects on the webpage.

Figure 1:
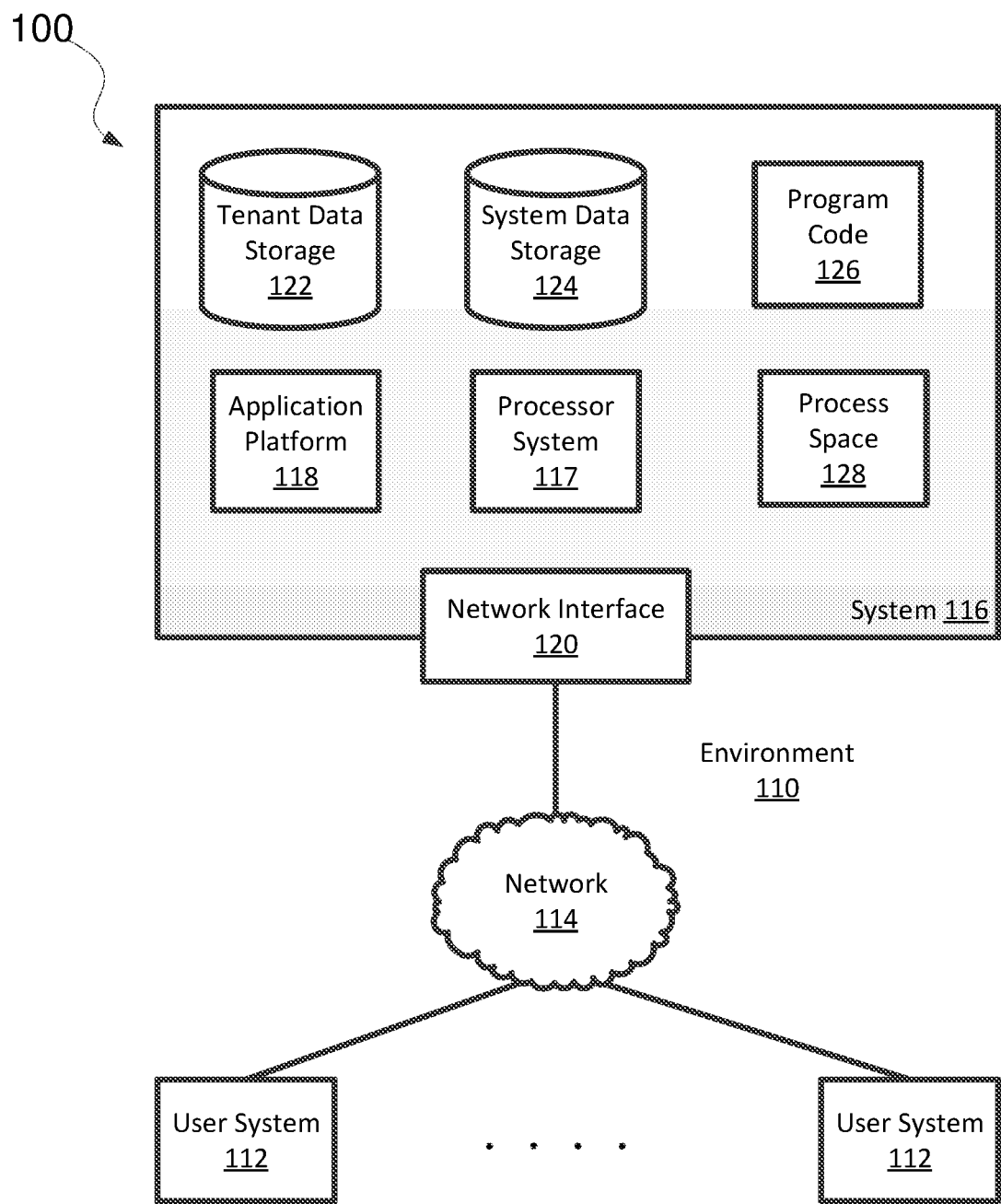
FIG. 1 illustrates a block diagram of an example environment according to some embodiments.

In the figures, elements having the same designations have the same or similar functions.

DETAILED DESCRIPTION

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one skilled in the art Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

I. Example Environment

The system and methods of the present disclosure can include, incorporate, or operate in conjunction with or in the environment of a database, which in some embodiments can be implemented as a multi-tenant, cloud-based architecture. Multi-tenant cloud-based architectures have been developed to improve collaboration, integration, and community-based cooperation between customer tenants without sacrificing data security. Generally speaking, multi-tenancy refers to a system where a single hardware and software platform simultaneously support multiple user groups (also referred to as "organizations" or "tenants") from a common data storage element (also referred to as a "multi-tenant database"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost-effective sharing of similar application features between multiple sets of users.

FIG. 1 illustrates a block diagram of an example environment 110 according to some embodiments. Environment 110 may include user systems 112, network 114, system 116, processor system 117, application platform 118, network interface 120, tenant data storage 122, system data storage 124, program code 126, and process space 128 for executing database system processes and tenant-specific processes, such as running applications as part of an application hosting service. In other embodiments, environment 110 may not have all of the components listed and/or may have other elements instead of, or in addition to, those listed above.

In some embodiments, the environment 110 is an environment in which an on-demand database service exists. A user system 112 may be any machine or system that is used by a user to access a database user system. For example, any of user systems 112 can be a handheld computing device, a mobile phone, a laptop computer, a notepad computer, a work station, and/or a network of computing devices. As illustrated in FIG. 1 (and in more detail in FIG. 2) user systems 112 might interact via a network 114 with an on-demand database service, which is system 116.

An on-demand database service, such as that which can be implemented using the system 116, is a service that is made available to users outside of the enterprise(s) that own, maintain or provide access to the system 116. As described above, such users do not need to necessarily be concerned with building and/or maintaining the system 116. Instead, resources provided by the system 116 may be available for such users' use when the users need services provided by the system 116—e.g., on the demand of the users. Some on-demand database services may store information from one or more tenants into tables of a common database image to form a multi-tenant database system (MTS). Accordingly, the "on-demand database service 116" and the "system 116" will be used interchangeably herein. The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image may include one or more database objects. A relational database management system (RDBMS) or the equivalent may execute storage and retrieval of information against the database object(s).

The application platform 118 may be a framework that allows the applications of system 116 to run, such as the hardware and/or software infrastructure, e.g., the operating system. In an embodiment, on-demand database service 116 may include an application platform 118 that enables creating, managing, and executing one or more applications developed by the provider of the on-demand database service, users accessing the on-demand database service via user systems 112, or third-party application developers accessing the on-demand database service via user systems 112.

The users of user systems 112 may differ in their respective capacities, and the capacity of a particular user system 112 might be entirely determined by permissions (permission levels) for the current user. For example, where a salesperson is using a particular user system 112 to interact with system 116, that user system has the capacities allotted to that salesperson. However, while an administrator is using that user system 112 to interact with system 116, that user system 112 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 114 is any network or combination of networks of devices that communicate with one another. For example, the network 114 can be any one or any combination of a local area network (LAN), wide area network (WAN), telephone network, wireless network, point-to-point network, star network, token ring network, hub network, or other appropriate configuration. As the most common type of computer network in current use is a transfer control protocol and Internet protocol (TCP/IP) network, such as the global inter network of networks often referred to as the "Internet" with a capital "I" that network will be used in many of the examples herein. However, it should be understood that the networks that the present embodiments might use are not so limited, although TCP/IP is a frequently implemented protocol.

The user systems 112 might communicate with system 116 using TCP/IP and, at a higher network level, use other common Internet protocols to communicate, such as hypertext transfer protocol (HTTP), file transfer protocol (FTP), Andrew file system (AFS), wireless application protocol (WAP), etc. In an example where HTTP is used, user system 112 might include an HTTP client commonly referred to as a "browser" for sending and receiving HTTP messages to and from an HTTP server at system 116. Such an HTTP server might be implemented as the sole network interface between system 116 and network 114, but other techniques might be used as well or instead. In some implementations, the interface between system 116 and network 114 includes load sharing functionality, such as round-robin HTTP request distributors to balance loads and distribute incoming HTTP requests evenly over a plurality of servers. At least for the users that are accessing that server, each of the plurality of servers has access to the MTS data; however, other alternative configurations may be used instead.

In some embodiments, the system 116, shown in FIG. 1, implements a web-based customer relationship management (CRM) system. For example, in one embodiment, system 116 includes application servers configured to implement and execute CRM software applications as well as provide related data, code, forms, webpages and other information to and from user systems 112 and to store to, and retrieve from, a database system related data, objects, and web page content. With a MTS, data for multiple tenants may be stored in the same physical database object. However, tenant data typically is arranged so that data of one tenant is kept logically separate from that of other tenants so that one tenant does not have access to another tenant's data, unless such data is expressly shared. In certain embodiments, the system 116 implements applications other than, or in addition to, a CRM application. For example, system 116 may provide tenant access to multiple hosted (standard and custom) applications, including a CRM application. User (or third-party developer) applications, which may or may not include CRM, may be supported by the application platform 118, which manages creation, storage of the applications into one or more database objects, and execution of the applications in a virtual machine in the process space of the system 116.

One arrangement for elements of the system 116 is shown in FIG. 1, including the network interface 120, the application platform 118, the tenant data storage 122 for tenant data 123, the system data storage 124 for system data 125 accessible to system 116 and possibly multiple tenants, the program code 126 for implementing various functions of the system 116, and the process space 128 for executing MTS system processes and tenant-specific processes, such as running applications as part of an application hosting service. Additional processes that may execute on system 116 include database indexing processes.

Several elements in the system shown in FIG. 1 include conventional, well-known elements that are explained only briefly here. For example, each of the user systems 112 could include a desktop personal computer, workstation, laptop, notepad computer, personal digital assistant (PDA), cellphone, or any wireless access protocol (WAP) enabled device or any other computing device capable of interfacing directly or indirectly to the Internet or other network connection. Each of the user systems 112 typically runs an HTTP client, e.g., a browsing program, such as Microsoft's Internet Explorer browser, Netscape's Navigator browser, Opera's browser, or a WAP-enabled browser in the case of a cell phone, notepad computer, PDA or other wireless device, or the like, allowing a user (e.g., subscriber of the MTS) of the user systems 112 to access, process, and view information, pages, and applications available to it from the system 116 over the network 114. Each of the user systems 112 also typically includes one or more user interface devices, such as a keyboard, mouse, trackball, touch pad, touch screen, pen or the like, for interacting with a graphical user interface (GUI) provided by the browser on a display (e.g., a monitor screen, liquid crystal display (LCD) monitor, light emitting diode (LED) monitor, organic light emitting diode (OLED) monitor, etc.) in conjunction with pages, forms, applications, and other information provided by the system 116 or other systems or servers. For example, the user interface device can be used to access data and applications hosted by system 116, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each of the user systems 112 and all of its components are operator configurable using applications, such as a browser, including computer code run using a central processing unit (CPU) such as an Intel Pentium® processor or the like. Similarly, system 116 (and additional instances of an MTS, where more than one is present) and all of their components might be operator configurable using application(s) including computer code to run using a CPU such as the processor system 117, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring the system 116 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a read-only memory (ROM) or random-access memory (RAM), or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory integrated circuits (ICs)), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, virtual private network (VPN), LAN, etc.) using any communication medium and protocols (e.g., TCP/IP, HTTP, HTTPS, Ethernet, etc.) as are well known. It will also be appreciated that computer code for implementing embodiments of the present disclosure can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun MicroSystems, Inc.).

According to one embodiment, the system 116 is configured to provide webpages, forms, applications, data and media content to the user (client) systems 112 to support the access by the user systems 112 as tenants of the system 116. As such, the system 116 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., object-oriented database management system (OODBMS) or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
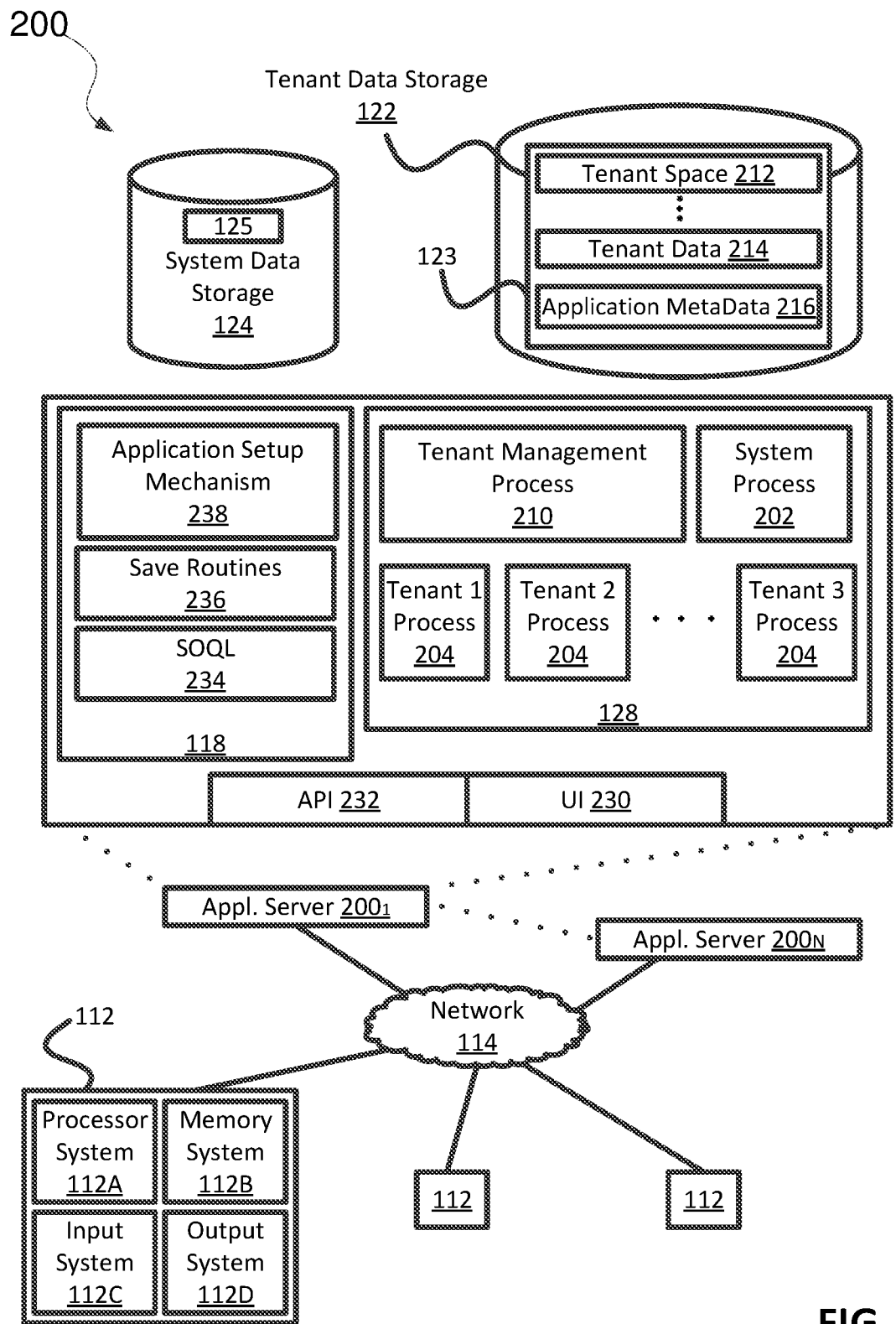
FIG. 2 illustrates a block diagram of another example environment according to some embodiments.

FIG. 2 also illustrates the environment 110, which may be used to implement embodiments described herein. FIG. 2 further illustrates elements of system 116 and various interconnections, according to some embodiments. FIG. 2 shows that each of the user systems 112 may include a processor system 112A, a memory system 112B, an input system 112C, and an output system 112D. FIG. 2 shows the network 114 and the system 116. FIG. 2 also shows that the system 116 may include the tenant data storage 122, the tenant data 123, the system data storage 124, the system data 125, a user interface (UI) 230, an application program interface (API) 232, a Salesforce.com object query language (SOQL) 234, save routines 236, an application setup mechanism 238, applications servers $200_1$-$200_N$, a system process space 202, tenant process spaces 204, a tenant management process space 210, a tenant storage area 212, a user storage 214, and application metadata 216. In other embodiments, environment 110 may not have the same elements as those listed above and/or may have other elements instead of, or in addition to, those listed above.

The user systems 112, the network 114, the system 116, the tenant data storage 122, and the system data storage 124 were discussed above in FIG. 1. Regarding the user systems 112, the processor system 112A may be any combination of one or more processors. The memory system 112B may be any combination of one or more memory devices, short term, and/or long term memory. The input system 112C may be any combination of input devices, such as one or more keyboards, mice, trackballs, scanners, cameras, and/or interfaces to networks. The output system 112D may be any combination of output devices, such as one or more monitors, printers, and/or interfaces to networks. As shown in FIGS. 1 and 2, the system 116 may include the network interface 120 (of FIG. 1) implemented as a set of HTTP application servers 200, the application platform 118, the tenant data storage 122, and the system data storage 124. Also shown is system process space 202, including individual tenant process spaces 204 and the tenant management process space 210. Each application server 200 may be configured to access the tenant data storage 122 and the tenant data 123 therein, and the system data storage 124 and the system data 125 therein to serve requests of the user systems 112. The tenant data 123 might be divided into individual tenant storage areas 212, which can be either a physical arrangement and/or a logical arrangement of data. Within each tenant storage area 212, the user storage 214 and the application metadata 216 might be similarly allocated for each user. For example, a copy of a user's most recently used (MRU) items might be stored to the user storage 214. Similarly, a copy of MRU items for an entire organization that is a tenant might be stored to the tenant storage area 212. The UI 230 provides a user interface and the API 232 provides an application programmer interface to the system 116 resident processes and to users and/or developers at the user systems 112. The tenant data and the system data may be stored in various databases, such as one or more Oracle™ databases.

The application platform 118 includes an application setup mechanism 238 that supports application developers' creation and management of applications, which may be saved as metadata into tenant data storage 122 by the save routines 236 for execution by subscribers as one or more tenant process spaces 204 managed by the tenant management process 210, for example. Invocations to such applications may be coded using SOQL 234 that provides a programming language style interface extension to the API 232. Some embodiments of SOQL language are discussed in further detail in U.S. Pat. No. 7,730,478, filed September, 2007, entitled, "Method and System For Allowing Access to Developed Applications Via a Multi-Tenant On-Demand Database Service," which is incorporated herein by reference. Invocations to applications may be detected by one or more system processes, which manage retrieving the application metadata 216 for the subscriber, making the invocation and executing the metadata as an application in a virtual machine.

Each application server 200 may be communicably coupled to database systems, e.g., having access to the system data 125 and the tenant data 123, via a different network connection. For example, one application server $200_1$ might be coupled via the network 114 (e.g., the Internet), another application server $200_{N-1}$ might be coupled via a direct network link, and another application server $200_N$ might be coupled by yet a different network connection. TCP/IP are typical protocols for communicating between application servers 200 and the database system. However, it will be apparent to one skilled in the art that other transport protocols may be used to optimize the system depending on the network connection used.

In certain embodiments, each application server 200 is configured to handle requests for any user associated with any organization that is a tenant. Because it is desirable to be able to add and remove application servers from the server pool at any time for any reason, there is preferably no server affinity for a user and/or organization to a specific application server 200. In one embodiment, therefore, an interface system implementing a load balancing function (e.g., an F5 Big-IP load balancer) is communicably coupled between the application servers 200 and the user systems 112 to distribute requests to the application servers 200. In one embodiment, the load balancer uses a least connections algorithm to route user requests to the application servers 200. Other examples of load balancing algorithms, such as round robin and observed response time, also can be used. For example, in certain embodiments, three consecutive requests from the same user could hit three different application servers 200, and three requests from different users could hit the same application server 200. In this manner, the system 116 is multi-tenant, wherein the system 116 handles storage of, and access to, different objects, data and applications across disparate users and organizations.

As an example of storage, one tenant might be a company that employs a sales force where each salesperson uses the system 116 to manage his or her sales process. Thus, a user might maintain contact data, leads data, customer follow-up data, performance data, goals and progress data, etc., all applicable to that user's personal sales process (e.g., in the tenant data storage 122). In an example of a MTS arrangement, since all the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all the users for a given organization that is a tenant. Thus, there might be some data structures managed by the system 116 that are allocated at the tenant level while other data structures might be managed at the user level. Because a MTS might support multiple tenants including possible competitors, the MTS should have security protocols that keep data, applications, and application use separate. Also, because many tenants may opt for access to a MTS rather than maintain their own system, redundancy, up-time, and backup are additional functions that may be implemented in the MTS. In addition to user-specific data and tenant-specific data, the system 116 might also maintain system level data usable by multiple tenants or other data. Such system level data might include industry reports, news, postings, and the like that are sharable among tenants.

In certain embodiments, the user systems 112 (which may be client systems) communicate with the application servers 200 to request and update system-level and tenant-level data from the system 116 that may require sending one or more queries to the tenant data storage 122 and/or the system data storage 124. The system 116 (e.g., an application server 200 in the system 116) automatically generates one or more structured query language (SQL) statements (e.g., one or more SQL queries) that are designed to access the desired information. The system data storage 124 may generate query plans to access the requested data from the database.

In a database system, such as system 116 shown and described with respect to FIGS. 1 and 2, data or information may be organized or arranged in categories or groupings. Each database can generally be viewed as a collection of objects, such as a set of logical tables, containing data fitted into predefined categories. A "table" is one representation of a data object and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. In a CRM system, for example, these categories or groupings can include various standard entities, such as account, contact, lead, opportunity, group, case, knowledge article, etc., each containing pre-defined fields. For example, a CRM database may include a table that describes a customer with fields for basic contact information such as name, address, phone number, fax number, etc. Another table might describe a purchase order, including fields for information such as customer, product, sale price, date, etc. In some MTS, standard entity tables might be provided for use by all tenants.

In some MTSs, tenants may be allowed to create and store custom objects, or they may be allowed to customize standard entities or objects, for example by creating custom fields for standard objects, including custom index fields. Systems and methods for creating custom objects as well as customizing standard objects in a MTS are described in further detail in U.S. Pat. No. 7,779,039, filed Apr. 2, 2004, entitled "Custom Entities and Fields in a Multi-Tenant Database System," which is incorporated herein by reference. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

II. Deep Linking to a Component Included in a Page

A record stored in the MTS may include a large amount of information that is displayed on a page. Information stored in the record may be arranged using a plurality of components. Additionally, the page may include the plurality of components organized in accordance with a hierarchy.

A component may be an object that affects the representation of a page. In some examples, a component is bound to a main record stored in a database (e.g., a MTS). The main record may store information that spans multiple database tables (e.g., a record that stores information about a company) and may include, for example, an account "sub-record" and an opportunity "sub-record" that are stored in the database. In an example, the information stored about a company may be stored in the main record, and the information may be further divided for ease of reference and stored into sub-records in the database. In this example, the information is organized in accordance with a structure using various sub-records.

In some examples, the component is not bound to a record. For example, a component may be a simple component such as a text component that displays formatted static text or may be a map component that displays directions or street information. In some examples, a component may be backend or frontend code that adds to the representation of a page, an application particle that is part of a larger application, or a mini-application including HTML, Javascript, and/or backend code that the component may call, etc.

A container refers to a special component that includes one or more components. A container may also be referred to as a component in some instances. Traditionally, components within multiple containers may not be deep linkable. For example, a container may be a tab set including multiple tab components. A user may change a visible state of the page when the user switches from one tab to another tab within the tab set.

The present disclosure provides techniques for deep linking to a component using configuration maps. For example, deep linking to the tab within the tab set provides a view of the tab and any components within the tab, during an initial page rendering. By way of another example, an email link to a post may bring the user to a webpage with a Feed component. If the Feed component is deep linkable, the Feed component is visible in response to the user selecting the link, even when the Feed component is not visible by default.

Deep linking may also be used to switch visibility of a deep linkable component after an initial rendering of the page, without navigating to a different page or reloading a browser. For example, while the user navigates through components on a page, the navigation path that is taken to arrive at a selected component may change. In this example, components may switch their visibility to not visible if they were visible in the previous but, are not needed in the new navigation path.

A plurality of components in a page may be traversed to arrive at a deep-linkable component. For example, the deep-linkable component may be included in a set of containers organized in accordance with a hierarchy. Each container has its own container configuration and its own lifecycle. A configuration of a container specifies the one or more components included in the container. As will be explained in more detail below, a container configuration may change the view of a page displayed to a user. A set of container configurations may correspond to the deep-linkable component, where each container configuration is a configuration of a container that includes the deep-linkable component at one or more levels in accordance with the hierarchy. A configuration map generator may generate a container configuration map including the set of container configurations for the deep-linkable component. The container configuration map is a "map" of relationships between components in the hierarchy, based on a path to the deep-linkable component in the page. In other words, the container configuration map may specify traversals through multiple components to arrive at the deep-linkable components. A renderer may analyze the container configuration map and know the path to traverse to find the deep-linkable component and display it along with other relevant information.

If a page includes a plurality of deep-linkable components, the configuration map generator may generate a container configuration map for each of the deep-linkable components. The configuration map generator may combine the one or more container configuration maps corresponding to different deep-linkable components into a single composite configuration map. A renderer may analyze the composite configuration map and know the path to traverse to find any deep-linkable component in the page and display relevant information. The render may use the composite configuration map to determine the components to display. By using the container configuration map, uniform access to data may be provided, even if a view of the data may be different (due to different data permissions, different devices being used to display the data, etc.).

An advantage of generating a composite configuration map for deep linking to a component may include providing uniform access to data, even if views of the page are different. For example, data may be represented using a different user interface (UI) structures that may depend on the device being used to render the page, the profile the user requesting the deep-linkable component, etc. For example, if the deep-linkable component is an address in a city, text directions to the address may be provided using a first device, and a map may be provided that shows graphical directions using a second device. The structure in which the data is provided is different, but both devices provide directions to the address.

Additionally, an advantage of generating a composite configuration map for deep linking to a component may include allowing different applications running on different devices to render the page based on the composite configuration map. The composite configuration map provides information specifying hierarchical relationships between components on the page. As long as an application understands the hierarchy and how the container configurations are represented, the different applications may provide access to the same information.

Figure 3:
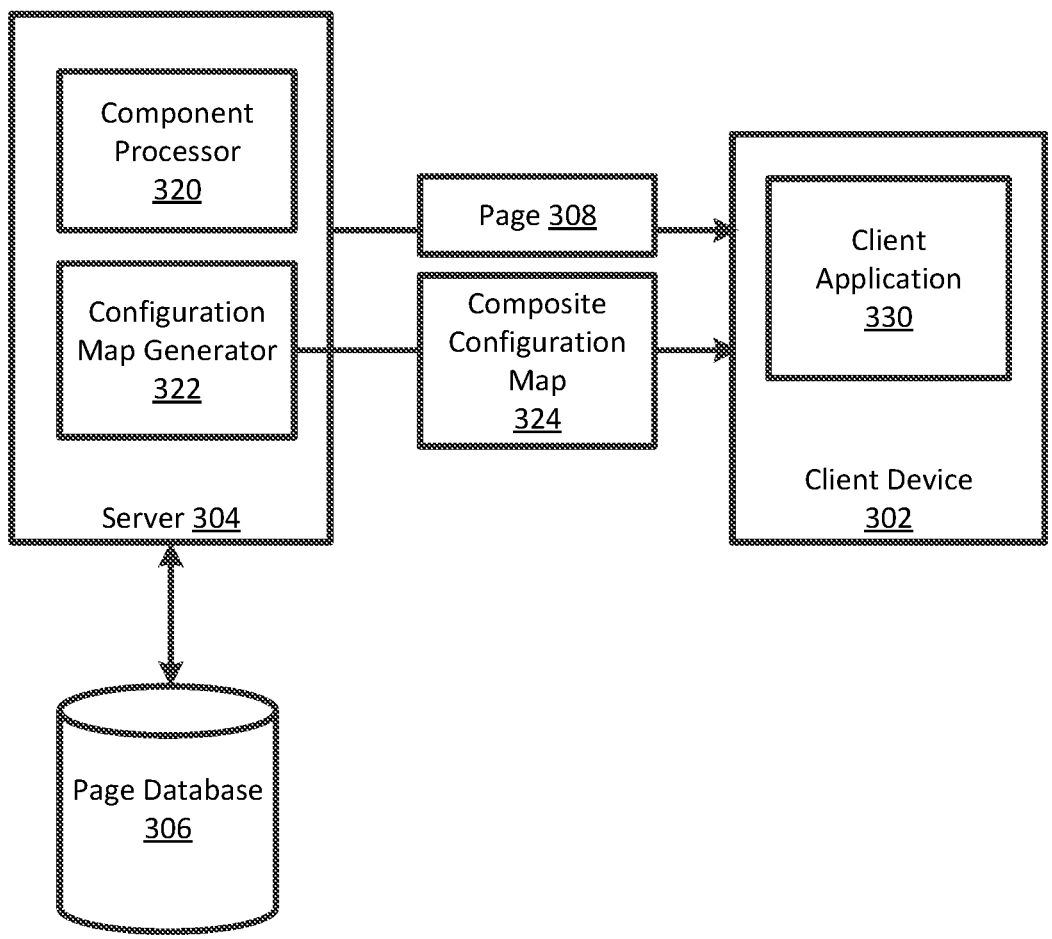
FIG. 3 illustrates an example system for deep linking to components according to some embodiments.

FIG. 3 illustrates an example system 300 for deep linking to components according to some embodiments. For example, components of diagram 300 may be, in some examples, implemented as part of the example environment 110. The system 300 includes a client device 302 and a server 304 coupled over a network (not shown). The network may be a private network (e.g., local area network (LAN), wide area network (WAN), intranet, etc.), a public network (e.g., the Internet), or a combination thereof. The network may include various configurations and use various protocols including virtual private networks, WANS, LANs, private networks using communication protocols proprietary to one or more companies, cellular and other wireless networks, Internet relay chat channels (IRC), instant messaging, simple mail transfer protocols (SMTP), Ethernet, Wi-Fi and Hypertext Transfer Protocol (HTTP), and various combinations of the foregoing. Although one server and one client device are illustrated in FIG. 3, this is not intended to be limiting, and system 300 may include more than one server and/or more than one client device.

The server 304 is coupled to a page database 306 that stores pages including a page 308. The page 308 includes a plurality of components organized in accordance with a hierarchy. In an example, the page 308 is a webpage having a hierarchy of components displayable on a screen. A component may be any object on the page 308 that is viewable by a user (e.g., text, user interface (UI) object (such as a tab set, tab, accordion, etc.)). A container is a special component that includes one or more components and may itself include a container.

Figure 4:
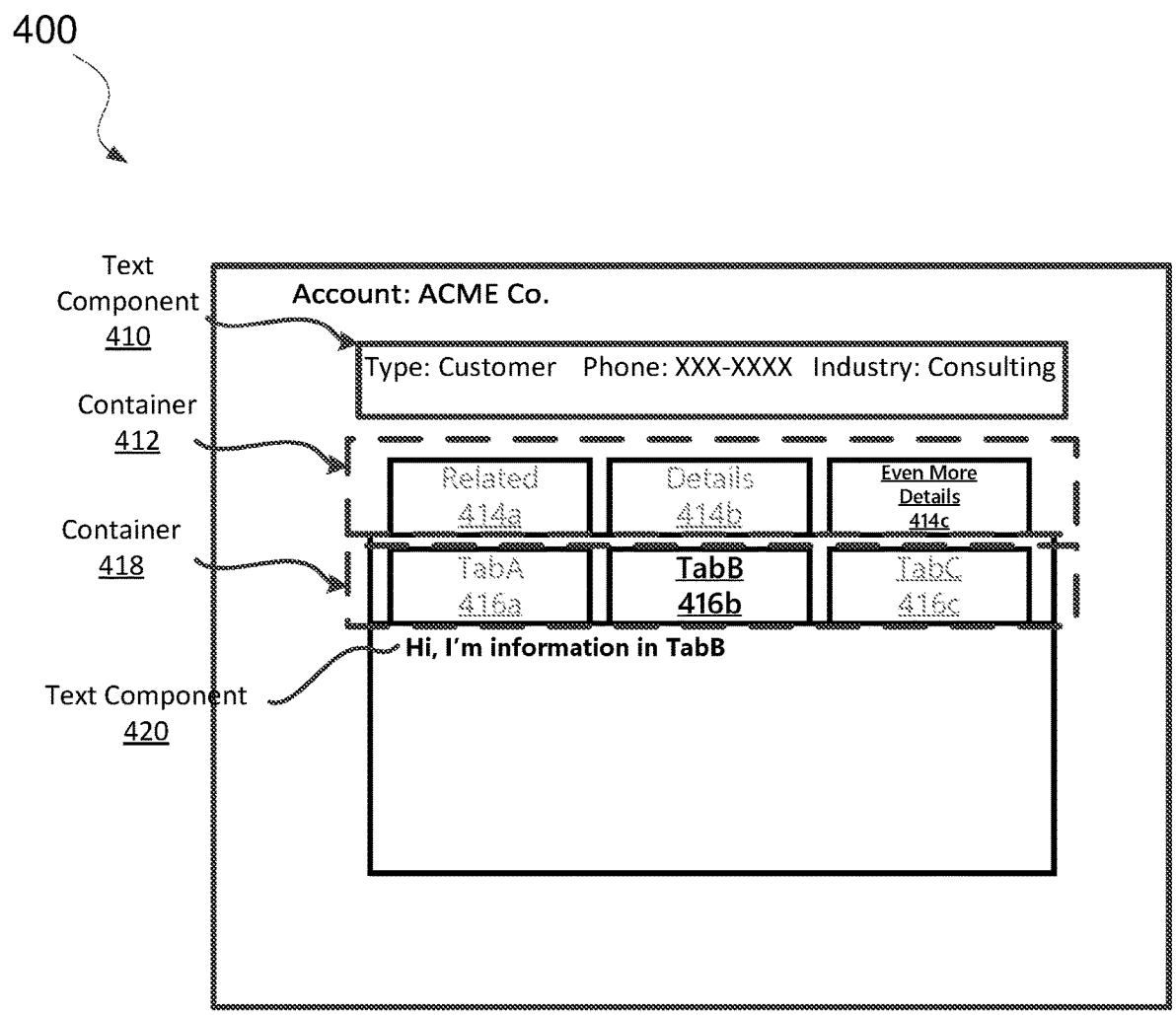
FIG. 4 illustrates an example visible state of a page according to some embodiments.
Figure 5:
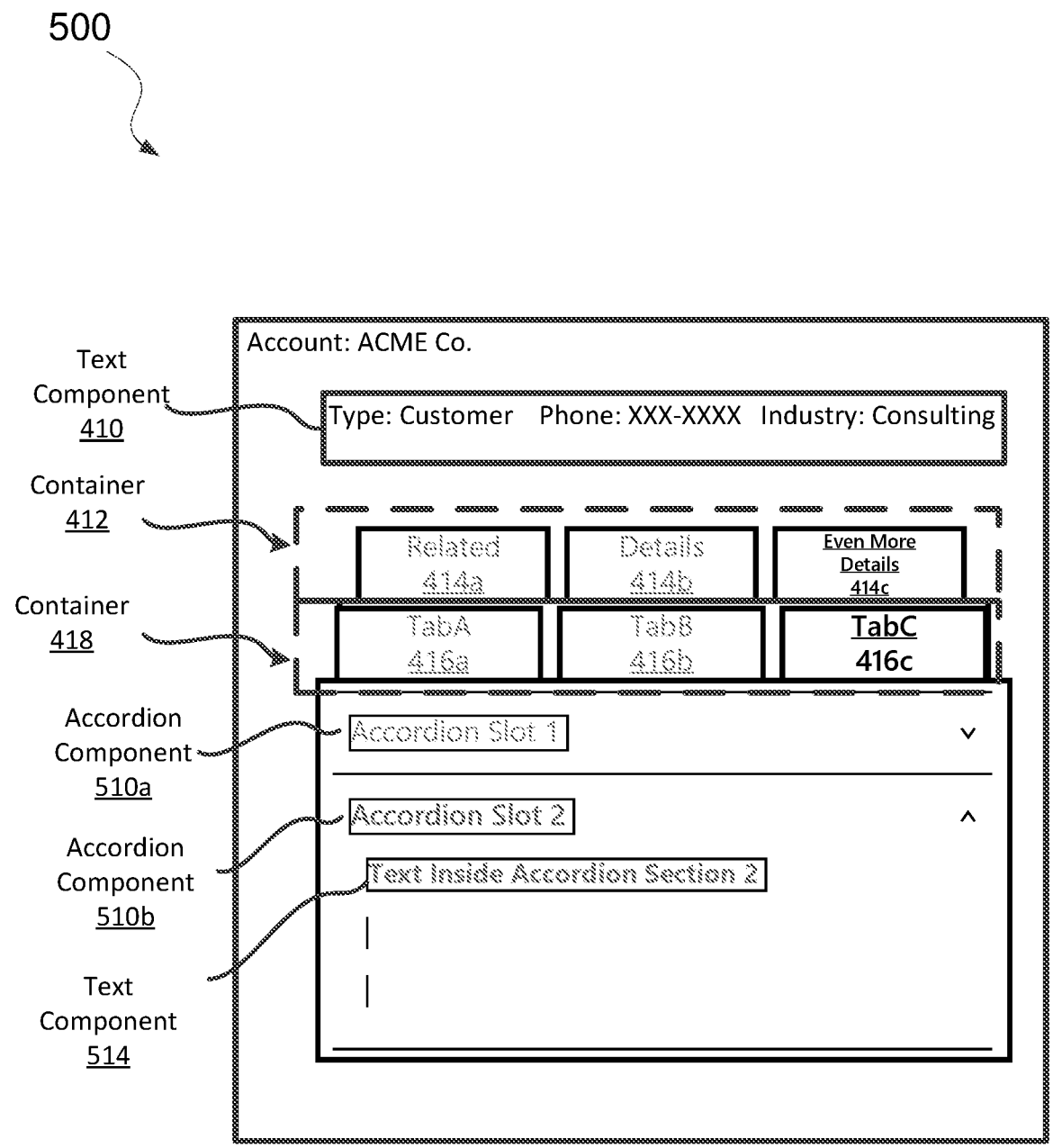
FIG. 5 illustrates another example visible state of the page according to some embodiments.

Each container in a page has a container configuration that controls a visible state of the page. The same page can have multiple visible states (e.g., when switching between tabs in a tab set). FIGS. 4 and 5 illustrate different visible states of the same page according to some embodiments. FIG. 4 illustrates an example visible state 400 of a page according to some embodiments. In an example, the page may include information about ACME Co., and the information about ACME Co. may be stored in a record associated with one or more database tables. The page in FIG. 4 may correspond to the page 308 in FIG. 3.

In FIG. 4, the page includes a text component 410, which displays account information related to ACME Co. The account information may be included in a record stored in the tenant data storage 122 in FIG. 1. In an example, if a user hovers her cursor over the text component 410, the text component 410 may provide a dialogue box with additional information stored in the record to the user.

Additionally, the page includes a container 412, which is shown as a tab set including a plurality of tab components 414a, 414b, and 414c. Each of the tab components 414a, 414b, and 414c may itself be a container including one or more components. A container may be located at a higher level in the hierarchy than the components included in the container. Conversely, the components included in a container may be located at a lower level in the hierarchy than the container. In the visible state 400, the tab components 414a and 414b are visible but are inactive components. An inactive component is a component that has not been selected by the user.

Conversely, in the visible state 400, the tab component 414c is an active component. An active component is a component that has been selected by the user. When a component is active, the component is visible and a set of zero or more components included in the active component may also be visible. A component is visible if it is displayed on a screen. A user may select a component by, for example, hovering her cursor over the component, scrolling up or down on a page including the component, clicking on the component using an input device (e.g., by pressing the primary mouse button down, then releasing it), double-clicking on the component, right-clicking on the component, dragging the component (e.g., by pressing the primary mouse button down on the component, moving the mouse to a different location while holding down the button, and then releasing the button), touching a location on a touch-sensitive screen at a location at or near the component, etc.

The container 412 has a container configuration including one or more of the tab components 414a, 414b, and 414c. A container can have multiple configurations, each configuration depending on a path traversed to arrive at a particular deep-linkable component included in the container at one or more levels in the hierarchy. The traversed path may refer to the user's selections of components (e.g., tabs) to arrive at the deep-linkable component on the page. For example, if a deep-linkable component is included in the tab component 414c, the configuration of the container 412 may include a mapping of the container 412 to the tab component 414c, for the deep-linkable component. In this example, the container configuration provides a map specifying that the tab component 414c is traversed to arrive at the deep-linkable component.

Additionally, the tab component 414c itself may be referred to as a container because the tab component 414c includes the container 418. The container 418 includes a plurality of tab components 416a, 416b, and 416c. Each of the tab components 416a, 416b, and 416c may itself be a container including one or more components. For example, the tab component 416b is a container that includes a text component 420. The container 412 is located at a higher level in the hierarchy than the container 418 because a component included in the container 412 includes the container 418. Conversely, the container 418 is located at a lower level in the hierarchy than the container 412 because the container 418 is included in a component included in the container 412.

If the user selects the tab component 416b, the visible state 400 of the page is shown to the user. Accordingly, the tab component 416b is visible and active. Additionally, the tab components 416a and 416c are visible but are inactive components. The container 418 has a container configuration including one or more of the tab components 416a, 416b, and 416c. For example, if the deep-linkable component is included in the tab component 416b (e.g., the text component 420), the configuration of the container 418 may include a mapping of the container 418 to the tab component 416b, for the deep-linkable component. In another example, if the deep-linkable component is the tab component 416b, the configuration of the container 412 may include a mapping of the container 412 to the tab component 414c, for the deep-linkable component.

FIG. 5 illustrates another example visible state 500 of a page according to some embodiments. In an example, the page may correspond to the same page displayed in FIG. 4. In FIG. 5, the page includes the text component 410, the container 412, and the container 418. In the visible state 500 of the page, the tab component 416c has been selected and is active. The tab component 416c is a container that includes a plurality of accordion components 510s and 510b. Accordingly, the tab component 416c is located at a higher level in the hierarchy than the accordion components 510a and 510b. In FIG. 5, the user has selected the accordion component 510b, which provides the visible state 500 of the page displayed to the user. The accordion component is a container including a text component 514. Additionally, in the visible state 500 of the page, the accordion component 510a is inactive.

The different visible states 400 and 500 refer to different views of the same page. As shown in the visible states 400 and 500 in FIGS. 4 and 5, respectively, the user may switch between the tab component 416b, which when selected causes the visible state 400 of the page to be displayed on a screen, and the tab component 416c, which when selected causes the visible state 500 of the page to be displayed on the screen. Accordingly, a configuration of a single container may change the visible state of the same location. A location may refer to information that is stored in the main record of a database (e.g., tenant database 122 in FIG. 1).

In some examples, the user may select a link associated with the deep-linkable text component 420 in FIG. 4, and a client device may display the visible state 400 in an initial rendering of the page. In this example, it is unnecessary for the user to navigate through the components of the page and select the tab component 414c and finally the tab component 416b, for display of the text component 420. Although two component traversals are discussed, it should be understood that the deep-linkable component may be at a "deeper" level of the hierarchy. Additionally, the user may select a link associated with the deep-linkable text component 514 in FIG. 5, and a client device may display the visible state 500 in an initial rendering of the page. Alternatively, if the user switches between tab components, the newly selected tab component may replace the current uniform resource locator (URL) with the URL associated with the newly selected tab. More details regarding processing of the composite configuration map by the client device are provided in below (see FIG. 8).

Different configurations of a container may correspond to different navigation paths in the hierarchy of components. A container may have different container configurations, which are dependent on a location of the deep-linkable component in the hierarchy of components. For example, if the deep-linkable component is the text component 420 in FIG. 4, a first container configuration of the container 418 includes a mapping from the container 418 to the tab component 416a. Alternatively, if the deep-linkable component is the text component 514 in FIG. 5, a second container configuration of the container 418 includes a mapping from the container 418 to the tab component 416c. Accordingly, although the user has not navigated to a new record when switching between tab components 416b and 416c, the container 418's container configuration changes in accordance with the selected component.

Referring back to FIG. 3, the server 304 includes a component processor 320 and a configuration map generator 322. The component processor 320 may process the plurality of components included in the page 308 and determine relationships between the components. The component processor 320 retrieves the page 308 from the page database 306. For each container of the plurality of components, the component processor 320 may determine whether the respective component is deep linkable. In response to a determination that the respective component is deep linkable, the component processor 320 passes an identifier of the deep-linkable component to the configuration map generator 322 for generation of a composite configuration map 324 for the page 308. The composite configuration map 324 will be described in more detail below in relation to FIG. 6.

The server 304 transmits the page 308 and the composite configuration map 324 to the client device 302 for processing. In an example, the server 304 transmits the page 308 and the composite configuration map 324 in response to a request from the client device 302 for the page 308. The client device 302 may include a client application 330 that locates, retrieves, and displays content on the World Wide Web, including webpages, images, video, text, and other files. In a client/server model, the client application 330 may be a software application (e.g., Web browser) running on the client device 302 that contacts a web server and requests information. The client application 330 may be designed for use with various web technologies such as Hypertext Transfer Protocol (HTTP), Hypertext Markup Language (HTML), JavaScript, Cascading Style Sheets (CSS), and other web technologies. HTML is a standard markup language for creating webpages and web applications. The client application 330 may request information from a web application and may receive HTML pages from the server hosting the web application. The client application 330 may render the visible states 400 and 500 shown in FIGS. 4 and 5, respectively.

III. Operational Flow for Generation of the Composite Configuration Map

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Figure 6:
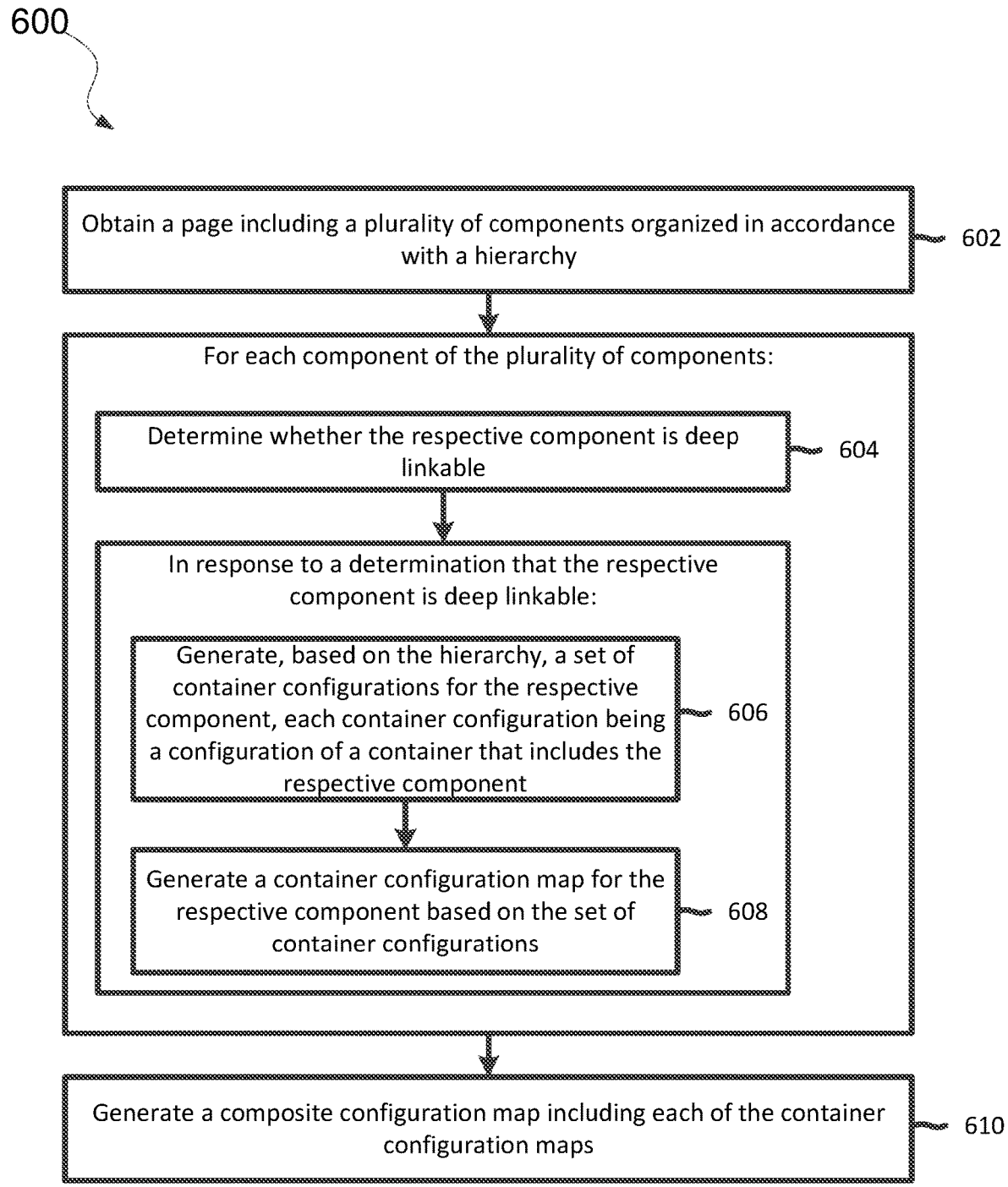
FIG. 6 is a flowchart of a method for generating a composite configuration map according to some embodiments.

FIG. 6 is a flowchart of a method 600 for generating a composite configuration map according to some embodiments. The composite configuration map may provide for deep linking through representing different visibility states of an application through providing container configurations. One or more of the processes 602-610 of the method 600 may be implemented, at least in part, in the form of executable code stored on non-transitory, tangible, machine-readable media that when run by one or more processors may cause the one or more processors to perform one or more of the processes 602-610. In some embodiments, method 600 can be performed by one or more computing devices in systems or diagrams 100, 200, and 300 of FIGS. 1, 2, and 3, respectively, including the component processor 320 and/or the configuration map generator 322. Aspects of the processes 602-610 of method 600 have been covered in the description for FIGS. 1, 2, and 3; and additional aspects are provided below.

Figure 7:
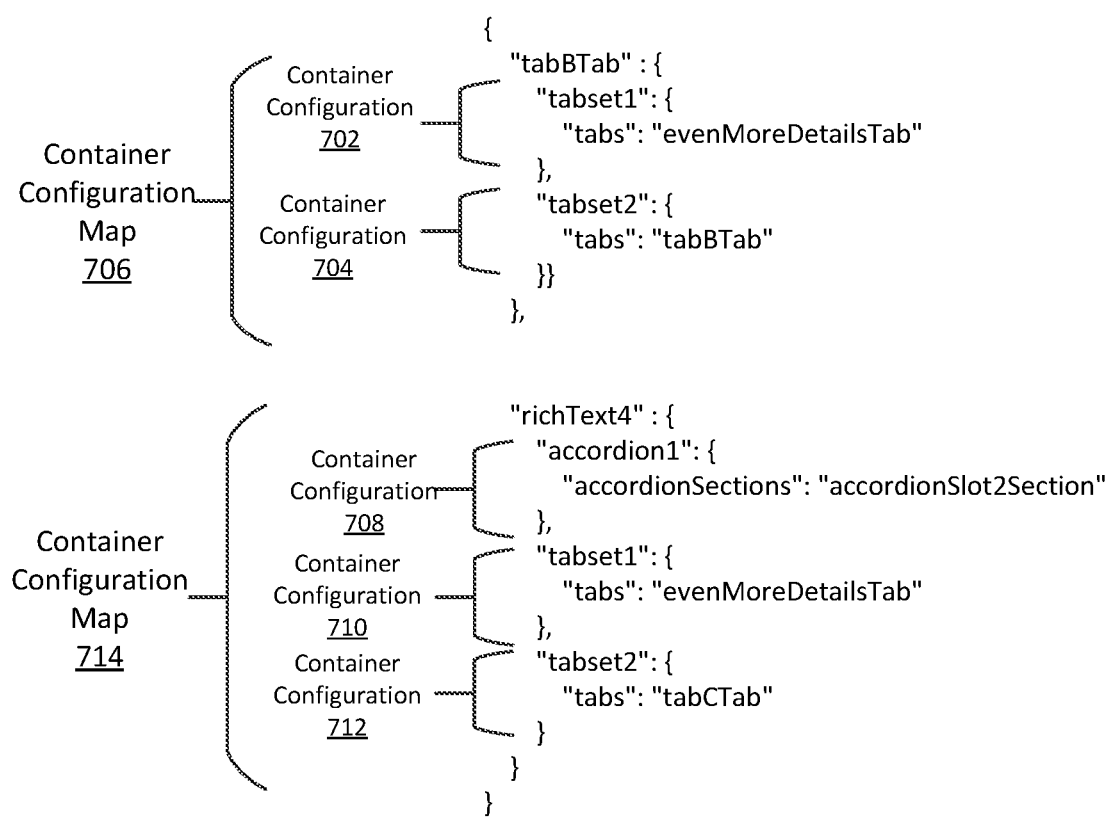
FIG. 7 illustrates an example composite configuration map according to some embodiments.

Additionally, FIG. 6 will be discussed in relation to FIG. 7 to provide examples of container configurations, container configuration maps, and the composite configuration map. FIG. 7 illustrates an example composite configuration map according to some embodiments. In an example, the composite configuration map shown in FIG. 7 is the composite configuration map 324 that is generated for the page 308 in FIG. 3.

Referring back to FIG. 6, at a process 602, a computing device (e.g., via component processor 320) obtains a page including a plurality of components organized in accordance with a hierarchy. The page may be the page 308 shown in FIG. 3 and may be displayed in accordance with the visible states 400 and 500 shown in FIGS. 4 and 5, respectively.

At a process 604, for each component of the plurality of components, a computing device (e.g., via component processor 320) determines whether the respective component is deep linkable. To reduce the size of the composite configuration map, it may be desirable to generate a container configuration map for only those components that are deep linkable rather than all components in the page.

A component may specify the component's capabilities. A component may have a programmable marker specifying a set of the component's capabilities. In an example, a component's capability may include being deep linkable. If a component does not specify that it is deep linkable, the component processor 320 may determine that the component is not deep linkable. In another example, a component's capability may include affecting visible. If the component affects visibility in a particular visible state of the page, it is desirable to calculate and display the component and any components included in it. A component may be visible without affecting visibility. For example, if the component is a frame with a label that is always displayed, the component does not affect visibility because the component is always shown.

In response to a determination that the respective component is deep linkable, the component processor 320 may pass an identifier of the deep-linkable component to the configuration map generator 322. The configuration map generator 322 may receive a list of component identifiers, each component identifier in the list identifying a deep-linkable component. The configuration map generator 322 may use the component identifiers to identify the appropriate components for performing processes 606 and 608.

In response to a determination that the respective component is deep linkable, the method 600 may proceed to processes 606 and 608. At the process 606, a computing device (e.g., via configuration map generator 322) generates, based on the hierarchy, a set of container configurations for the respective component, each container configuration being a configuration of a container that includes the respective component. Additionally, the process 608, a computing device (e.g., via configuration map generator 322) generates a container configuration map for the respective component based on the set of container configurations. Additionally, the process 608, a computing device (e.g., via configuration map generator 322) generates a container configuration map for the respective component based on the set of container configurations. The container configuration map for the deep-linkable component takes into consideration whether a component included in the container configuration affects visibility. If the component does not affect visibility, the configuration map generator 322 may determine to not include this component in the container configuration map.

Referring to the example composite configuration map shown in FIG. 7, the deep-linkable components may be "tabBtab" (corresponding to the tab component 416b in FIGS. 4 and 5) and "richText4" (corresponding to the text component 514 in FIG. 5). Each of these deep-linkable components may be included in one or more containers. Multiple components may be traversed to arrive at the deep-linkable component. As shown in FIGS. 4 and 5, the tab component 416b is included in both of the containers 412 and 418. For the deep-linkable component "tabBtab," the configuration map generator 322 generates container configurations 702 and 704 (corresponding to the containers 412 and 418, respectively, in FIG. 4). The container configuration 702 is a configuration of the "tabset1" container (corresponding to the component 412 in FIG. 4) and includes a mapping of the "tabset1" container to the "eventMoreDetailsTab" tab (corresponding to the tab component 414c in FIG. 4). Additionally, the container configuration 704 is a configuration of the "tabset2" container (corresponding to the component 418 in FIG. 4) and includes a mapping of the "tabset2" container to the "TabBTab" tab (corresponding to the tab component 416b in FIG. 4). In this example, the configuration map generator 322 may generate, based on the hierarchy of the page, the set of container configurations 702 and 704 for the deep-linkable component "tabBtab." Each of the container configurations 702 and 704 is a configuration of a container that includes the component "tabBtab."

Additionally, the configuration map generator 322 generates a container configuration map 706 for the deep-linkable component "tabBtab" based on the set of container configurations 702 and 704. The ordering of the container configurations in the container configuration map 706 is inconsequential. The set of container configurations for a deep-linkable component provides a map into the traversal of components in the hierarchy to arrive at the deep-linkable component. Additionally, the set of container configurations 702 and 704 may indicate whether the components included in the set of container configurations 702 and 704 affect visibility.

In the example illustrated in FIG. 7, a deep-linkable component is "richText4" (corresponding to the text component 514 in FIG. 5). The configuration map generator 322 may perform similar actions to generate container configurations 708, 710, and 712 for the deep-linkable component "richText4" as discussed for the deep-linkable component "tabBTab". The configuration map generator 322 generates a container configuration map 714 including the container configurations 708, 710, and 712. Additionally, the set of container configurations 708, 710, and 712 may indicate whether the components included in the set of container configurations 708, 710, and 712 affect visibility.

At a process 610, a computing device (e.g., via configuration map generator 322) generates a composite configuration map including each of the container configuration maps. In an example, the configuration map generator 322 generates the composite configuration map 324 including the container configuration maps 706 and 714. The configuration map generator 322 may generate the composite configuration map 324 at the backend.

In some embodiments, one or more actions illustrated in processes 602-610 may be performed for any number of objects per-tenant. It is also understood that additional processes may be performed before, during, or after processes 602-610 discussed above. It is also understood that one or more of the processes of method 600 described herein may be omitted, combined, or performed in a different sequence as desired.

For example, each view of a page has its own unique composite configuration map. The processes 602-610 may be performed for each page.

Additionally, to generate the composite configuration map 324, the configuration map generator 322 may generate an intermediate map used for storing immediate parent identifier and component information while generating the container configurations. The configuration map generator 322 may generate the intermediate map by recursively traversing the hierarchy, starting from the deep-linkable component to a parent until a root component is reached. A root component does not have a parent. The intermediate map includes child-parent relationships that may be traversed to generate the composite configuration map 324.

IV. Process the Composite Configuration Map

Figure 8:
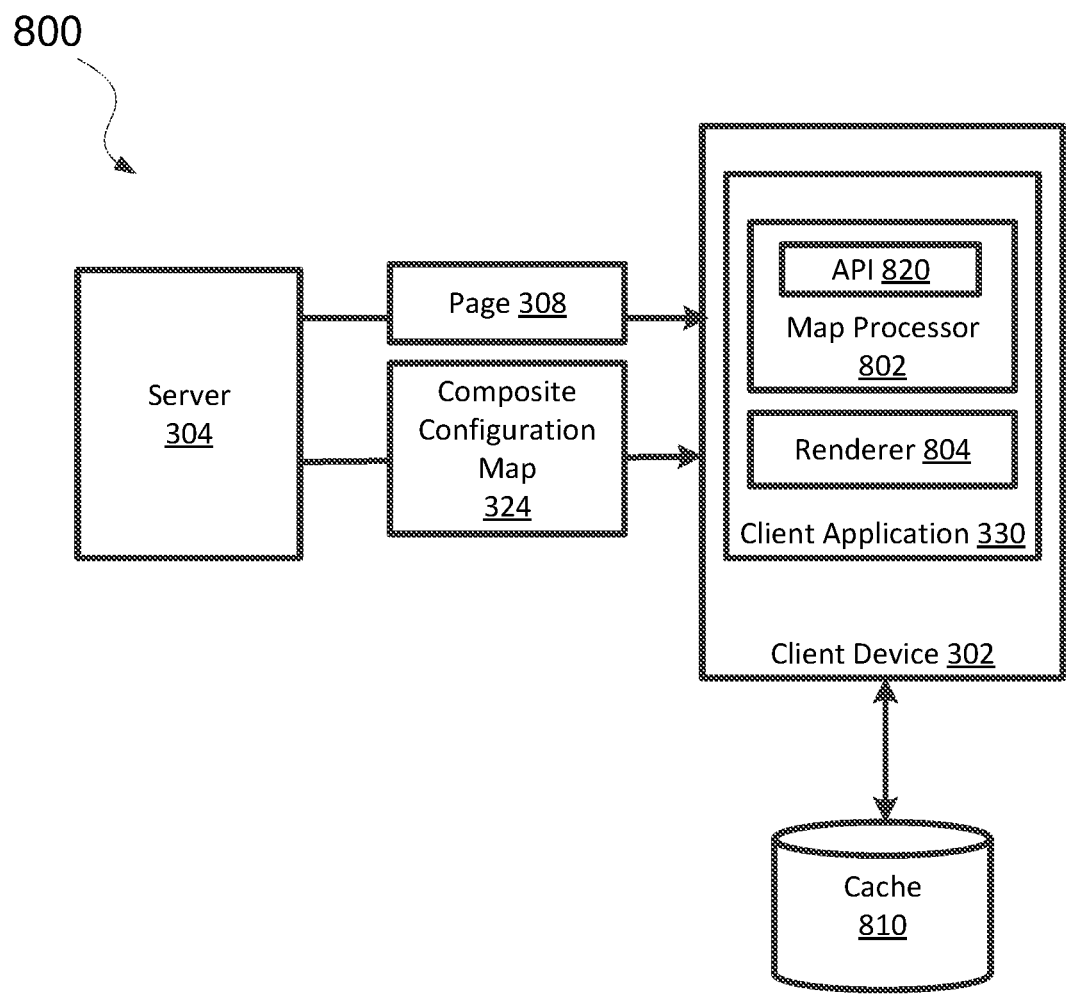
FIG. 8 illustrates an example system for processing a composite configuration map according to some embodiments.

FIG. 8 illustrates an example system 800 for processing a composite configuration map according to some embodiments. For example, components of diagram 800 may be, in some examples, implemented as part of the example environment 110. In the example illustrated in FIG. 8, the client device 302 receives the page 308 and the composite configuration map 324. The client application 330 includes a map processor 802 and a renderer 804. The map processor 802 analyzes the composite configuration map 324 and the renderer 804 renders a page in a visible state, where the visible state is dependent on the component that is being deep linked. The renderer 804 may render the visible state including the deep-linkable component during an initial page rendering (e.g., based on a URL).

Additionally, the client device 302 is coupled to a cache 810. The map processor 802 may store the composite configuration map 324 in the cache 810 for later retrieval. In doing so, it may be unnecessary for the client device 302 to request the page 308 and/or the composite configuration map 324 from the server 304 if either are to be used for resolving a deep-linkable component. Additionally, when the map processor 802 generates information to deep link into a component, the map processor 802 may cache that information to improve performance when the user desires to deep link into the component at a later point in time.

The map processor 802 may determine the selected deep-linkable component on which to base the visible state of a page. Each deep-linkable component may be associated with a URL. The user may receive the URL associated with the deep-linkable component. The URL may be sent to the user in various ways (e.g., email message, text message, etc.). In response to the user selecting the URL (e.g., by clicking the URL), the map processor 802 may determine the visible state of the page and the renderer 804 may display the visible state, which displays the deep-linkable component during an initial rendering of the page. In another example, the user may already have the page open on the client device. The user may interact with the components on the page and select a deep-linkable component (e.g., switching between tabs). The deep-linkable component may update the URL with the URL associated with the deep-linkable component. The renderer 804 consumes the updated URL by displaying a view of the page including the deep-linkable component.

In an example, the map processor 802 exposes one or more application programming interfaces (APIs) 820. Each component in the page may be a proactive component. For example, a component may invoke an API 820 to request display information from the map processor 802. Display information may include, for example, whether the component includes other components and which components to display. The map processor 802 may analyze the composite configuration map 324 in response to the call to the API 820, and identify the component configuration map for a particular deep-linkable component. In response to the request, the map processor 802 provides the component with its container configuration. The container configuration indicates the component's display information. For example, if the selected deep-linkable component is "richText4" as shown in FIG. 7, each of the "accordion1," "tabset1," and "tabset2" containers may invoke the API 820 to request its container configuration. Based on the returned container configuration, each container knows what to display. For example, the map processor 802 provides the "accordion1" container with the container configuration 708, which informs the "accordion1" container to display "accordionSlot2Section" (corresponding to the accordion component 510b in FIG. 5). Additionally, the map processor 802 provides the "tabset1" container with the container configuration 710, which informs the "tabset1" container to display "evenMoreDetailsTab" (corresponding to the tab component 414c in FIGS. 4 and 5).

The map processor 802 may analyze the composite configuration map 324 to resolve multiple paths to multiple components. The order in which the container configurations are set forth in the composite configuration map is inconsequential because each container will correctly display its provided configuration, which is based on the selected deep-linkable component. Additionally, the map processor 802 may provide the container configurations to requesting components in any order. For example, it is inconsequential whether the "accordion1" container or the "tabset1" container initializes first in terms of the data that is displayed. Accordingly, uniform data will be accessible to the user regardless of the initialization sequence that may be different between devices. As long as the container is provided with its proper container configuration, the container displays the correct information.

If the user attempts to access a deep-linkable component that the user does not have permission to view, the map processor 802 may process the URL associated with the deep-linkable component and attempt to resolve the depth to the deep-linkable component. For example, if an employee in Human Resources department attempts to send a URL associated with a component showing the salary of employees to someone outside of the Human Resources department, the map processor 802 may be unable to resolve a path to the deep-linkable component. In this example, the renderer 804 may render the default presentation of the page. If the Human Resources employee attempts to send the URL associated with the salary component to another employee in the Human Resources department, the map processor 802 may resolve the path and the renderer 804 may render the salary component during an initial rendering of the page. Additionally, the same location may be represented using different views with different components of the same page. For example, the Human Resources employee may be presented with a different view of a page than employees in other departments. Accordingly, for the same record, different people may have different views, depending on their profiles when the record is loaded.

The composite configuration map 324 may contain a large amount of data and grow as components are added to a page. In an example, to save time and processing cycles, the map processor 802 identifies those sections within the composite configuration map 324 that are applicable to the selected deep-linkable component. For example, if the deep-linkable component is "richText4" in the composite configuration map shown in FIG. 7, the map processor 802 may review the relevant components included in the composite configuration map 714 and ignore the irrelevant components such as those not included in the composite configuration map 714.

In some examples, the composite configuration map is implemented as a hash map of a hash map. In this example, a lookup of container configurations in the composite configuration map result in a low-cost operation. Additionally, a component may have the ability to switch presentation (e.g., a tab set may switch from display of one tab to another tab within the tab set) and specify this capability. Moreover, components may talk to each other and send information back and forth.

Unless specifically stated otherwise as apparent from the following discussion, it is appreciated that throughout the description, discussions utilizing terms such as "determining," "obtaining," "inserting," "executing," "receiving," "transmitting," "identifying," "generating," "determining," "traversing," and the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may include a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Although illustrative embodiments have been shown and described, a wide range of modifications, changes and substitutions is contemplated in the foregoing disclosure and in some instances, some features of the embodiments may be employed without a corresponding use of other features. One of ordinary skill in the art would recognize many variations, alternatives, and modifications. Thus, the scope of the disclosure should be limited only by the following claims, and it is appropriate that the claims be construed broadly and in a manner consistent with the scope of the embodiments disclosed herein.

What is claimed is:

1. A computing device comprising:
a memory containing machine readable medium storing machine executable code; and
one or more processors coupled to the memory and configurable to execute the machine executable code to cause the one or more processors to:
obtain a page including a plurality of components organized in accordance with a hierarchy;
for each component of the plurality of components:
determine whether the respective component is deep linkable; and
in response to a determination that the respective component is deep linkable:
generate, based on the hierarchy, a set of container configurations for the respective component, each container configuration being a configuration of a container that includes the respective component; and
generate a container configuration map for the respective component based on the set of container configurations; and
generate a composite configuration map including each of the container configuration maps.

2. The computing device of claim 1, wherein a first component of the plurality of components has a programmable marker specifying a set of capabilities of the first component.

3. The computing device of claim 1, wherein a capability includes being deep linkable.

4. The computing device of claim 1, wherein a capability includes affecting visibility of the page.

5. The computing device of claim 1, wherein the machine executable code further causes the one or more processors to:
traverse each component of the plurality of components; and
generate an intermediate map including parent-child relationships between the traversed components.

6. The computing device of claim 5, wherein the composite configuration map is based on the intermediate map.

7. The computing device of claim 1, wherein a second component of the plurality of components is included in a plurality of containers.

8. The computing device of claim 1, wherein a third component of the plurality of components is at least one of a text component or a user interface (UI) component.

9. The computing device of claim 1, wherein the UI component is selectable in the page.

10. The computing device of claim 1, wherein a fourth component of the plurality of components is a mini-application.

11. The computing device of claim 1, wherein a first container has a plurality of container configurations in the composite configuration map.

12. The computing device of claim 11, wherein the plurality of container configurations corresponds to different deep-linkable components in the page.

13. A method performed by one or more processors executing machine executable code, the method comprising:
obtaining a page including a plurality of components organized in accordance with a hierarchy;
for each component of the plurality of components:
determining whether the respective component is deep linkable; and
in response to a determination that the respective component is deep linkable:
generating, based on the hierarchy, a set of container configurations for the respective component, each container configuration being a configuration of a container that includes the respective component; and
generating a container configuration map for the respective component based on the set of container configurations; and
generating a composite configuration map including each of the container configuration maps.

14. The method of claim 13, further comprising:
traversing each component of the plurality of components; and
generating an intermediate map including parent-child relationships between the traversed components.

15. The method of claim 14, wherein generating the composite configuration map includes generating the composite configuration map based on the intermediate map.

16. The method of claim 13, wherein a first component of the plurality of components is at least one of a text component or a UI component.

17. The method of claim 13, wherein a second component of the plurality of components is a mini-application.

18. The method of claim 13, wherein a first container has a plurality of container configurations in the composite configuration map.

19. The method of claim 18, wherein the plurality of container configurations corresponds to different deep-linkable components in the page.

20. A non-transitory machine-readable medium comprising executable code which when executed by one or more processors associated with a computing device are adapted to cause the one or more processors to perform a method comprising:
obtaining a page including a plurality of components organized in accordance with a hierarchy;
for each component of the plurality of components:
determining whether the respective component is deep linkable; and
in response to a determination that the respective component is deep linkable:
generating, based on the hierarchy, a set of container configurations for the respective component, each container configuration being a configuration of a container that includes the respective component; and
generating a container configuration map for the respective component based on the set of container configurations; and
generating a composite configuration map including each of the container configuration maps.

* * * * *